US009168722B2

(12) United States Patent
Suga et al.

(10) Patent No.: US 9,168,722 B2
(45) Date of Patent: Oct. 27, 2015

(54) LOW GLOSSINESS-METALLIC LUSTER DECORATIVE SHEET, AND LAMINATED BODY LAMINATING SAME

(75) Inventors: Kazuhiro Suga, Tokyo-to (JP); Hiroyuki Atake, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 1155 days.

(21) Appl. No.: 11/576,165

(22) PCT Filed: Sep. 29, 2005

(86) PCT No.: PCT/JP2005/018017
§ 371 (c)(1),
(2), (4) Date: Mar. 28, 2007

(87) PCT Pub. No.: WO2006/035901
PCT Pub. Date: Apr. 6, 2006

(65) Prior Publication Data
US 2008/0070013 A1    Mar. 20, 2008

(30) Foreign Application Priority Data
Sep. 29, 2004    (JP) .................................. 2004-284112

(51) Int. Cl.
*B32B 3/00* (2006.01)
*B32B 33/00* (2006.01)
(Continued)

(52) U.S. Cl.
CPC ........... *B32B 33/00* (2013.01); *B29C 45/14811* (2013.01); *B32B 3/30* (2013.01); *B44C 1/14* (2013.01); *B29C 35/08* (2013.01); *B29C 45/1418* (2013.01); *B29C 51/10* (2013.01); *B29C 2791/001* (2013.01); *B29C 2791/006* (2013.01); *B29K 2705/00* (2013.01); *B32B 15/00* (2013.01);
(Continued)

(58) Field of Classification Search
None
See application file for complete search history.

(56) References Cited

U.S. PATENT DOCUMENTS 4,305,981 A * 12/1981 Muroi et al. ..................... 428/31
4,448,814 A *  5/1984 Shimizu et al. ............... 427/387
(Continued)

FOREIGN PATENT DOCUMENTS

JP         04163197 A  *  6/1992
JP         5-39583         2/1993
(Continued)

OTHER PUBLICATIONS

JP 2000-062081 (English Translation).*

*Primary Examiner* — Gerard Higgins
*Assistant Examiner* — Sathavaram I Reddy
(74) *Attorney, Agent, or Firm* — Ladas & Parry LLP

(57) ABSTRACT

A low glossiness-metallic luster decorative sheet with a low glossiness feeling added to a metallic luster feeling, and a laminated body thereof. Glossiness change at the time of molding is reduced. In a configuration with a metallic luster layer, and a low glossiness-resin layer containing a delustering agent provided to a substrate sheet in the order of the low glossiness-resin layer and the metallic luster layer from the closer side when viewed from one side, the low glossiness-resin layer has a large number of minute opening parts such that the metallic luster layer can be observed in the minute opening parts without the low glossiness-resin layer. By laminating the same onto the substrate by such as a molding method, a laminated body can be provided. The metallic luster layer viewed in the minute opening parts realizes a high brilliance metallic luster feeling while providing low glossiness.

3 Claims, 3 Drawing Sheets

(51) Int. Cl.
  *B32B 3/30* (2006.01)
  *B44C 1/14* (2006.01)
  B32B 15/00 (2006.01)
  B29C 35/08 (2006.01)
  B29C 45/14 (2006.01)
  B29C 51/10 (2006.01)
  B29K 705/00 (2006.01)
(52) U.S. Cl.
  CPC ......... *B32B 2250/05* (2013.01); *B32B 2307/40* (2013.01); *B32B 2307/408* (2013.01); *B32B 2405/00* (2013.01); *B32B 2451/00* (2013.01); *Y10T 428/24355* (2015.01); *Y10T 428/24479* (2015.01); *Y10T 428/24917* (2015.01)

(56) References Cited

U.S. PATENT DOCUMENTS 5,270,097 A * 12/1993 Amemiya et al. ............ 428/156
5,928,803 A *  7/1999 Yasuda ........................ 374/101

FOREIGN PATENT DOCUMENTS

| | | | |
|---|---|---|---|
| JP | 11-70800 | | 1/1999 |
| JP | 2000-062081 | * | 2/2000 |
| JP | 2000-62081 | | 2/2000 |
| JP | 2001-038854 A | | 2/2001 |
| JP | 2004-009630 A | | 1/2004 |

* cited by examiner

LOW GLOSSINESS-METALLIC LUSTER DECORATIVE SHEET, AND LAMINATED BODY LAMINATING SAME

TECHNICAL FIELD

The present invention relates to a low glossiness-metallic luster decorative sheet having a low glossiness feeling such as a surfacing mat, together with a metallic luster, and a laminated body laminating the same on a surface of a substrate.

BACKGROUND ART

Conventionally, as a metallic luster decorative sheet for providing a metallic luster feeling such as a metallic tone, those provided with a bright resin layer of a bright ink or paint containing a bright pigment such as a metal powder, or with a metal thin film layer are known. Furthermore, with the decorative sheet surface of a low glossiness, a low glossiness-metallic luster decorative sheet with a sedate metallic luster feeling can be provided.

As such a low glossiness-metallic luster decorative sheet, various configurations have been proposed.

Examples thereof include:
(1) one using a resin film prepared by forming a film of a resin composition with a delustering agent added as a component of a resin film material by a T-die extrusion method,
(2) one using a resin film prepared by further forming a white spot pattern with an emboss roll on the resin film containing a delustering agent of the above item (1), and
(3) one using a resin film with no delustering agent added to form a low glossiness-resin layer thereon by printing or coating a delustering ink containing a delustering agent.
[Patent document 1] Japanese Patent Application Laid-Open (JP-A) No. 5-39583

DISCLOSURE OF THE INVENTION

Problem to be Solved by the Invention

However, according to the configuration of the above item (1), problems as follows are caused: the entirety in the thickness direction of the resin film becomes opaque so as to lower the transparency, the printing voids are generated at the time of printing and forming the bright resin layer due to the influence of the delustering agent, and the low glossiness degree can hardly be stable. Moreover, problems as follows at the time of forming the resin film are also caused: the above (1) configuration can be a cause of the pollution of the T-die device, and the addition amount of the delustering agent is limited because the film is melted to form, so that a low glossiness product has hardly ever been obtained.

Moreover, according to the configuration of the above item (2), the surface rugged shape shaped additionally by the emboss process has the glossiness change by the surface rugged shape being made shallower by sheet heating at the time of the molding application such as vacuum molding. Moreover, even when a press process is applied to the printed surface side of the resin film with a mirror surface roll, depending on the dispersion state of the delustering agent contained in the resin film itself, a patch pattern is generated on the surface so that the patches become apparent on the highly brilliant bright resin layer.

According to the configuration of the above item (3) the problems of the above items (1) and (2) are not generated as well as a low glossiness-resin layer can be formed with an even low glossiness degree so that a stable product without an extreme glossiness change even with different observation angles can be obtained. On the other hand, the metallic luster feeling obtained by the metallic luster layer, observed through the low glossiness-resin layer, is lowered as a whole so that it has been insufficient as the design expression of the highly brilliant metallic luster feeling.

An object of the present invention is to realize a design with a high brilliance metallic luster feeling and with a low glossiness in a low glossiness-metallic luster decorative sheet which has a low glossiness feeling such as a surfacing mat together with a metallic luster feeling, and a laminated body with the same laminated on the substrate surface. Moreover, it is also to reduce the glossiness change at the time of molding.

Means for Solving the Problem

To solve the above-mentioned problems, the present invention provides a low glossiness-metallic luster decorative sheet comprising a metallic luster layer and a low glossiness-resin layer containing a delustering agent provided on a substrate sheet in the order of the low glossiness-resin layer and the metallic luster layer from the closer side when viewed from one side (that is, an observer side), wherein the low glossiness-resin layer has a large number of minute opening parts through which the metallic luster layer can be observed without the low glossiness-resin layer.

According to the configuration, even if the low glossiness feeling is provided to the metallic luster feeling a high brilliance metallic luster feeling can be obtained despite the provided a low glossiness. This is because a large number of minute opening parts which reveal the metallic luster layer therebelow without the low glossiness-resin layer are scattered in the low glossiness-resin layer, and the metallic luster layer observed in the portions, increases of the metallic luster feeling in the entire surface.

Furthermore, since the low glossiness-resin layer has a thickness and the concave portion of the minute opening parts have a side surface, depending on the relationship between the size of the concave portion of the minute opening parts and its height, the metallic luster layer to be exposed from the minute opening parts can be observed in the entire region in the minute opening parts when viewed from the front surface. However, it can be observed only partially with the low glossiness-resin layer providing the obstacle when viewed from the oblique direction. The increasing degree of the metallic luster feeling obtained through the minor opening parts is higher when observed from the front surface than from the oblique direction. Therefore, with the observation direction moving from the front surface to the oblique direction, the metallic luster feeling is lowered so that the metallic luster feeling changing with the viewing direction can be obtained. On the other hand, as to the low glossiness degree of the low glossiness-resin layer, the minute opening parts tend to be hidden by the low glossiness-resin layer when observed from the oblique direction. However, the entire region in the minute opening parts (without formation of the low glossiness-resin layer) can be observed from the front surface. Therefore, the glossiness change, in which the glossiness is lowered by the movement of the observation direction from the front surface to the oblique direction, can be obtained. In case of a real metal, it may generate the glossiness change by a certain sensitivity so as to provide a metal feeling. According to the low glossiness-metallic luster decorative sheet, the same phenomenon can be expressed in a pseudonic manner by the above-mentioned metallic luster feeling and glossiness angle change. As a result, a realistic low glossiness metallic luster feeling can be obtained.

Moreover, as a preferable form of the low glossiness-metallic luster decorative sheet of the present invention, there is a configuration in which a transparent substrate sheet is provided as a transparent substrate sheet, and a metallic luster layer is provided on the rear surface side and a low glossiness-resin layer is provided on the front surface side of the substrate sheet.

The configuration allows such as follows: the metallic luster layer and the low glossiness-resin layer can be formed independently on the front and rear sides of the substrate sheet, the substrate sheet can be provided as a protection layer for the metallic luster layer, and the depth feeling can be provided to the metallic luster feeling.

The low glossiness-metallic luster decorative sheet of the present invention is a low glossiness-metallic luster decorative sheet for molding in any of the above-mentioned configurations.

In the present invention, the low glossiness is provided by the low glossiness resin layer containing a delustering agent without relying on the surface ruggedness by the emboss process. Thus, even when the decorative sheet is applied for the molding application with heat, or heat and stress applied at the time of molding, the glossiness change at the time of the molding operation is small. In this regard, the molding application is a preferable application.

Moreover, a laminated body of the present invention is a laminated body having a configuration with the above-mentioned low glossiness-metallic luster decorative sheet laminated on the surface of the substrate. The substrate may be for example a resin shaped product, a wood-based three-dimensional product, or plate; and the laminated body is for example a molded product.

According to the laminated body of such a configuration, since the effects of the above-mentioned low glossiness-metallic luster decorative sheet can be obtained in a laminated body, even in the case of providing a low glossiness feeling to a metallic luster feeling, a high brightness metallic luster feeling can be obtained while having a low glossiness. Furthermore, like a real metal, the phenomenon of the metallic luster feeling and glossiness change depending on the viewing angle can be expressed in a pseudonic manner so that the realistic low glossiness metallic luster feeling can also be obtained.

Effect of the Invention (1) According to the low glossiness-metallic luster decorative sheet of the present invention, even in the case of providing a low glossiness feeling to a metallic luster feeling, a high brightness metallic luster feeling can be obtained while having a low glossiness. Furthermore, like a real metal, the phenomenon of the metallic luster feeling and glossiness change depending on the viewing angle can be expressed in a pseudonic manner so that the realistic low glossiness metallic luster feeling can also be obtained. This can be also obtained when the decorative sheet is used for molding applications.

(2) According to the laminated body of the present invention, the effects of the above-mentioned low glossiness-metallic luster decorative sheet can be obtained in a laminated body.

Figure 1A:
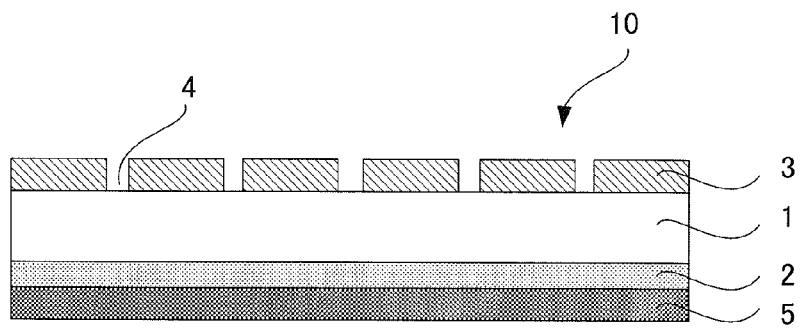
FIGS. 1A and 1B are each a cross-sectional view and a plan view for schematically explaining a low glossiness-metallic luster decorative sheet of the present invention.

EXPLANATION OF REFERENCES 1 substrate sheet
2 metallic luster layer
3 low glossiness-resin layer
4, 4' minute opening part
5 adhesive layer
6 backer layer
7 adhesive layer
8 substrate
10, 10' low glossiness-metallic luster decorative sheet
20 laminated body
41 vacuuming hole
42 sheet clamp
43 heater
Ma injection molding mold (male mold)
Mb injection molding mold (female mold)

BEST MODE FOR CARRYING OUT THE INVENTION

Figure 1B:
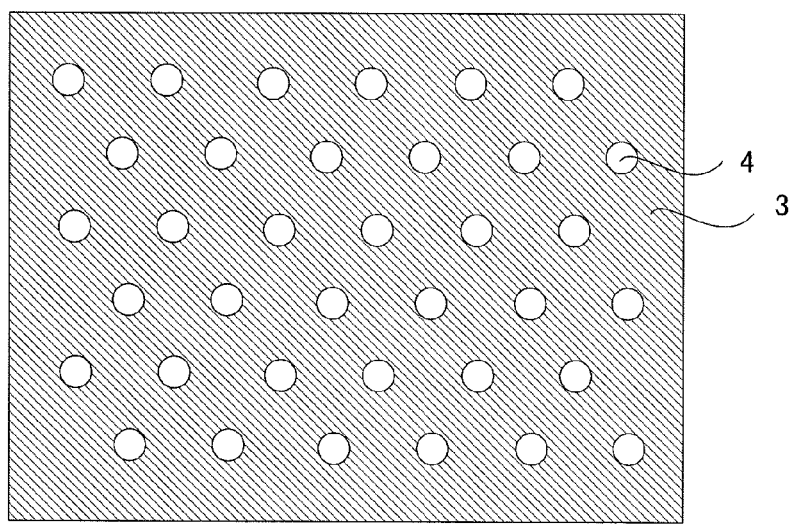
Figure 2:
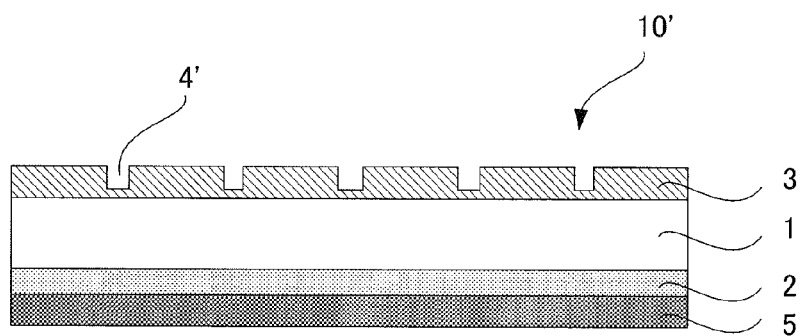
FIG. 2 is a cross-sectional view showing another form of a low glossiness-metallic luster decorative sheet of the present invention.
Figure 3A:
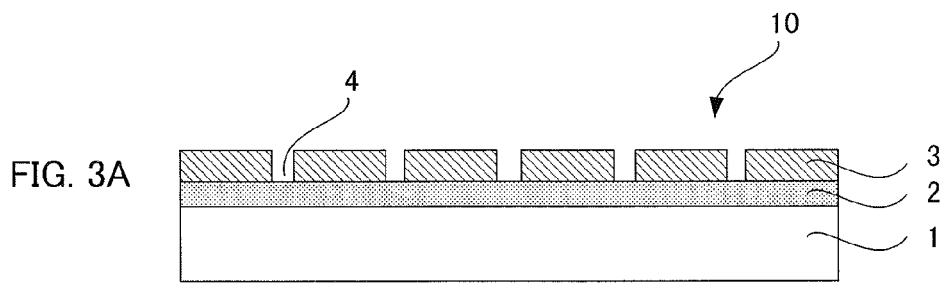
FIGS. 3A and 3B are each a cross-sectional view showing another form of a low glossiness-metallic luster decorative sheet of the present invention.
Figure 3B:
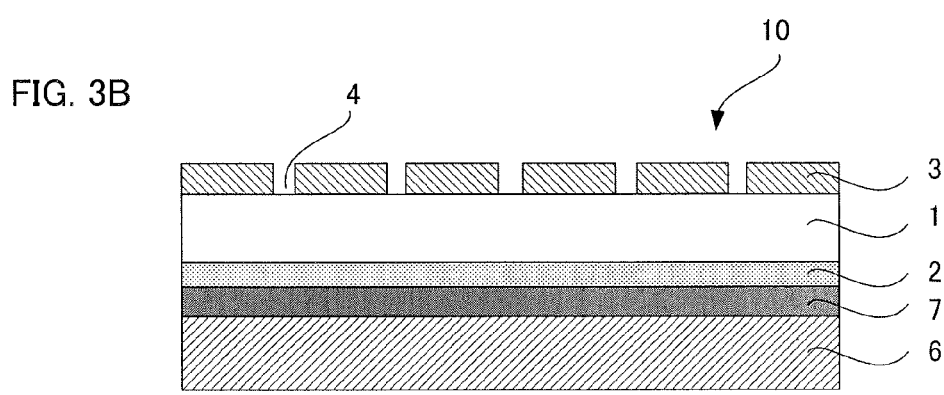
Figure 4:
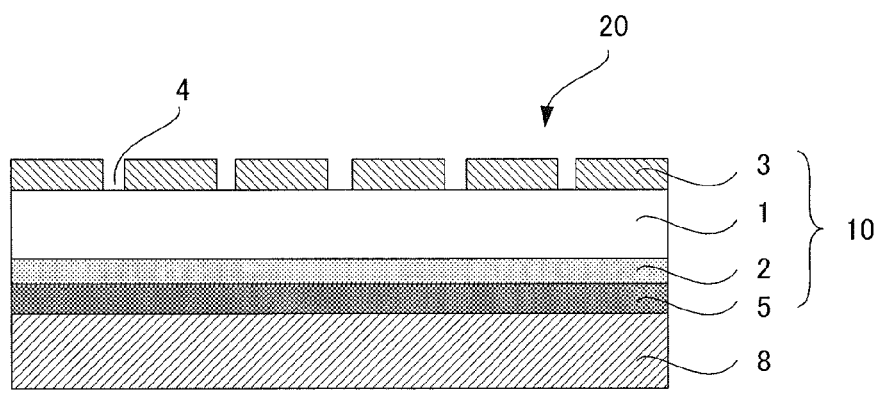
FIG. 4 is a cross-sectional view showing a form of a laminated body of the present invention.
Figure 5A:
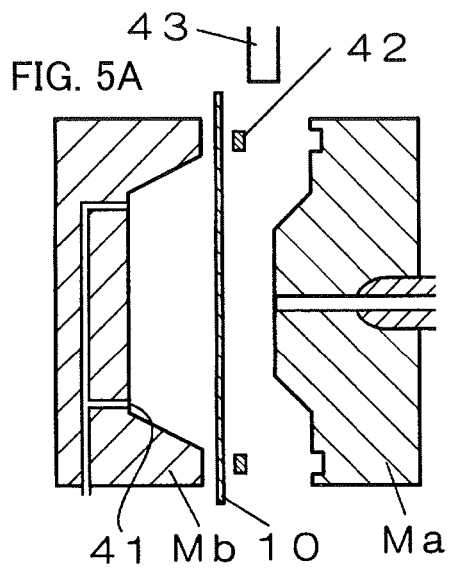
FIGS. 5A to 5C are a conceptual diagram for explaining a form of an injection molding simultaneous lamination method as an application of molding.
Figure 5B:
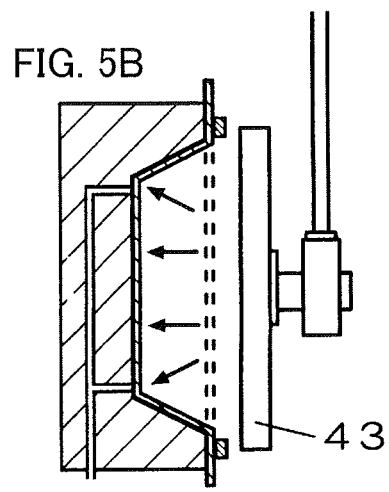
Figure 5C:
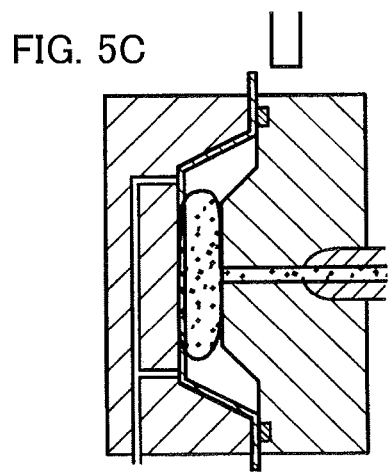

Hereinafter, with reference to the drawings, a best mode for carrying out the present invention will be explained. FIGS. 1A and 1B are each an explanatory diagram as a cross-sectional view and a plan view for schematically explaining a low glossiness-metallic luster decorative sheet of the present invention; FIG. 2 and FIGS. 3A to 3B are each a cross-sectional view showing another form of a low glossiness-metallic luster decorative sheet of the present invention; FIG. 4 is a cross-sectional view showing a form of a laminated body of the present invention; and FIGS. 5A to 5C is a conceptual diagram for explaining a form of an injection molding simultaneous lamination method as a molding method in a molding application.

<Outline>

A low glossiness-metallic luster decorative sheet 10 shown in the cross-sectional view of FIG. 1A comprises a metallic luster layer 2, and an adhesive layer 5 formed successively on the rear side surface of a substrate sheet 1. A low glossiness-resin layer 3 containing a delustering agent is formed on the front side surface of the substrate sheet 1, and, the low glossiness-resin layer 3 has a large number of minute opening parts 4 so that the metallic luster layer 2 can be observed without seeing through the low glossiness-resin layer 4 in the minute opening parts 4. It is noted that, obviously, the low glossiness-resin layer has its glossiness lowered by its surface minute ruggedness, and it is formed as the uppermost surface layer which is the uppermost surface on the observer side. Therefore, the observer side is on the upward direction in the figure. Moreover, according to this configuration, since the metallic luster layer 2 should be viewed through the substrate sheet 1, the substrate sheet is naturally a transparent substrate sheet.

A large number of the minute opening parts 4 of the low glossiness-resin layer 3 are scattered in the plane of the low glossiness-resin layer 3 as shown in the plan view of FIG. 1B.

FIG. 1B is an example with the minute opening parts of a round shape and of a hounds tooth check regular arrangement as the scattering manner.

Moreover, in the low glossiness-resin layer in the present invention having a large number of the minute opening parts, the above-mentioned minute opening parts may be provided completely through the low glossiness-resin layer, or the low glossiness-resin layer may be formed by a thickness to the extent that the metallic luster of the metallic luster layer can be visually observed.

FIG. 2 is a schematic cross-sectional view showing an example of the case with the minute opening parts provided not completely through the layer. As shown in FIG. 2, the low glossiness-metallic luster decorative sheet 10' of the present invention may be one having the minute opening parts 4' of the low glossiness-resin layer 3 not completely thorough the low glossiness-resin layer 3 but with the thickness of the low glossiness-resin layer 3 is partially a thickness to the extent that the metallic luster of the metallic luster layer 2 can be observed visually.

The minute opening parts of a form as shown in FIG. 2 is formed mainly by the openings covered with spread of the low glossiness resin ink after printing the low glossiness-resin layer. However, since the thickness of the low glossiness-resin layer has a thin thickness in a spreading portion, the effect of the delustering agent is insufficient compared with the other portions so that the metallic luster layer can sufficiently be recognized visually through the portion, and thus it can substantially function as a minute opening part.

The front side surface, the front side, and the front surface in the present invention refer to a surface on the observer side and it is a surface on the upward side in the figure. In contrast, the rear side surface, the rear side and the rear surface refer to a surface on the opposite side and it is a surface on the downward side in the figure.

The adhesive layer 5 shown in FIG. 1A is provided as needed, and can be omitted depending on the case. On the other hand, the low glossiness-metallic luster decorative sheet 10 in each of FIGS. 3A and 3B is an example of a configuration without the adhesive layer 5. Further, the low glossiness-metallic luster decorative sheet 10 in each FIGS. 3A and 3B is an example of a form with the positional relationship of the metallic luster layer 2 and the low glossiness-resin layer 3 with respect to the substrate sheet 1 different from that of FIGS. 1A and 1B, in which they are provided on the same surface side (front surface side) of the substrate sheet 1 in the order of the metallic luster layer 2 and the low glossiness-resin layer 3. Accordingly, as the low glossiness-metallic luster decorative sheet, the low glossiness-resin layer 3 may be disposed at a position nearest to the observer side, the metallic luster layer at a farther position, and the substrate sheet at an optional position capable of supporting the same. However, in the case the substrate sheet is disposed on the closer side of the observer side with respect to the metallic luster layer, it may be provided transparently for allowing the same to be seen.

The low glossiness-metallic luster decorative sheet 10 of the present invention basically has the configuration of FIG. 1A irrespective of the adhesive layer 5 existence. However, as the configuration having an adhesive layer on the rear surface of the same figure, additional layers in the conventionally known decorative sheets (for example, a decorative layer, a backer layer 6 [see FIG. 3B], or a primer layer) may be added optionally within a scope not departed from the gist of the present invention.

A laminated body 20 of the present invention as shown in the cross-sectional view of FIG. 4 can be obtained by laminating such a low glossiness-metallic luster decorative sheet 10 using optionally an adhesive layer to the substrate 8 with a known lamination method of, especially with various kinds of molding methods with heat, or heat and stress applied to the film, because it is a preferable application capable of utilizing the characteristics of the present invention that little glossiness change is caused at the time of molding of the low glossiness-resin layer.

<Substrate Sheet>

As to the substrate sheet 1, depending on the positional relationship with the metallic luster layer, transparency may be required, but in the case it is not required, it may be opaque. Moreover, in the case it is applied for the molding application, one capable of satisfying the physical properties necessary for the use application such as the drawn molding properties may be used so that known resin sheets may be used according to the application. As examples of such substrate sheets, thermoplastic resin sheets made of thermoplastic resins can be presented. As examples of the thermoplastic resins, polyolefin based resins, polyester based resins, acrylic resins, polycarbonate resins, polyamide resins, fluorine based resins, vinyl chloride resins, and styrene based resins can be presented. Moreover, a multiple layer configuration of the substrate sheets of the same kind or of different kinds of resins may be used as well. These may be also utilized as a transparent substrate sheet. Moreover, in the case it may be opaque, ABS resins, or the like can also be utilized as the substrate sheet.

As examples the polyolefin based resins, polyethylene, polypropylene, polymethyl pentene, polybutene, or olefin based thermoplastic elastomer can be presented. As examples of the polyester based resins, polyester resins such as polyethylene terephthalate, polybutylene terephthalate and polyethylene naphthalate; amorphous polyester resins (A-PET) such as terephthalic acid-isophthalic acid-ethylene glycol copolymer, terephthalic acid-ethylene glycol-1,4 cyclohexane dimethanol copolymer and polyethylene terephthalate; or polyester based thermoplastic elastomers can be presented. Moreover, as examples of the acrylic resins, polymethyl methacrylate, methyl polyacrylate, or polyethyl methacrylate can be presented. As the polyamide resins, nylon 6, nylon 9, or nylon 6,6 can be presented as examples. As the fluorine based resins, polyvinyl fluoride, polyvinylidene fluoride, polyvinylidene 3 fluoride, or ethylene-4 ethylene fluoride copolymer can be presented as examples.

Among the above-mentioned thermoplastic resins, the acrylic resins are preferable as they have the excellent physical properties in terms of such as the transparency, the light resistance, the molding suitability, the surface hardness, the heat resistance, the chemical resistance, or the surface luster.

Moreover, the substrate sheet may be colored as transparent coloring, opaque coloring, or the like. For coloring, a known coloring agent may be used optionally. In the case of transparent one, it may be translucent.

Moreover, the thickness of the substrate is not particularly limited basically. Depending on its application, it is in general about 50 to 500 μm.

Moreover, in the case the substrate sheet is opaque, it may be made of, such as paper, metal foil, metal plate, or wood plate. In the case of a plate, the thickness is, naturally, 1 mm or more in general.

<Metallic Luster Layer>

The metallic luster layer 2 may be known one. For example, a bright resin layer containing a bright pigment in a resin binder, a metal thin film layer, or a metal foil may be used optionally. However, in the case of drawing in the molding application, among them, a bright resin layer is preferable in terms of the drawing easiness. As the resin for the bright pigment and the resin binder, known ones can be adopted optionally.

For example, as the bright pigment, a pigment having a pearly luster or interference luster, made of metal powders or metal foils such as aluminum powders, copper powders and brass powders, or foils of a titanium dioxide covered mica, acid bismuth chloride can be used. Therefore, in the bright resin layer, in addition to the metallic luster feeling which is the luster literally by a metal, the so-called pearly (pearl) glossy feeling can be expressed as well. That is, the "metallic luster feeling" in the present invention also includes the pearly glossy feeling. This is because, although the pearly glossy feeling has a taste different from the metallic luster feeling, in terms of leaving the high brilliance of the original pearly glossy feeling while providing a low glossiness, it is same in the case of providing a low glossiness to the metallic luster feeling so that the corresponding effect of the present invention can be obtained. However, it is obviously different from the viewpoint of copying the change caused depending on the viewing angle, which is peculiar to the real metal.

The shape of the bright pigment is preferably scale-like because it has a good molding suitability and a strong brilliant feeling so that the same brilliant feeling can be obtained by a small content. For example, a scale-like aluminum can be presented.

Moreover, the resin of the resin binder can be optionally adopted according to the application. For example, thermoplastic resins such as acrylic resins, vinyl chloride-vinyl acetate copolymers, polyester resins, cellulose based resins and urethane resins may be used alone or as a mixture. Moreover, as the binder resin, in terms of the drawing easiness in the molding application, the thermoplastic resins is more preferable than curing resins such as thermosetting resins and ionizing radiation curing resins. However, when such a performance is not required, in consideration to the other required physical properties such as the adhesion properties and the heat resistance, curing resins such as urethane resins, acrylic resins and alkyd resins can be used as well.

The bright resin layer may be colored, and therefore, a known coloring agent may optionally be contained.

As to the formation of the bright resin layer, a bright ink or a bright paint with a bright pigment dispersed in a resin binder may be formed on the surface on the rear side of the substrate sheet by a known printing method or coating method. For example, as the printing method, gravure printing, offset printing, or screen printing, and as the coating method, roll coating, or die coating can be presented.

As the metallic luster layer, a metal thin film layer may be formed using for example a metal such as aluminum, chromium, indium, tin, gold, silver and copper by a known thin film forming method such as vacuum deposition, sputtering deposition, ion beam deposition, plasma deposition and plating. On the other hand, as a metal foil, aluminum foil, or the like may be used.

The metallic luster layer is formed in general as an entire surface solid layer, however, it may be a partial solid layer provided solidly only inside a pattern of for example a character, graphic, geometric pattern. Moreover, the metallic luster layer may represent a pattern, or the like by itself.

<Low Glossiness-Resin Layer>

The low glossiness-resin layer 3 is a resin layer having a low glossiness surface with a large number of minute opening parts scattered, which can be formed with a delustering ink with a delustering agent contained in a resin binder. As the delustering ink, those already known can be selected and used optionally. However, since it should be formed with a large number of the minute opening parts provided, it is preferable to pay attention to the leveling characteristics and the thixotropic characteristics. The thickness of the low glossiness-resin layer is in general 1 to 10 g/m$^2$ based on the (solid component) coating amount.

Moreover, the "low glossiness" basically denotes that it is lower in glossiness than the mirror surface so that its degree depends on the design to be required. However, with the delustering degree increased, the transparency of the low glossiness-resin layer is lowered by the delustering agent so that the metallic luster feeling is clouded and brightness is lowered. With such a background, the high brightness characteristics of the minute opening parts of the present invention can be effectively utilized in a lower glossiness region, specifically, in a region with a specular gloss Gs (60°) of 30 or less.

As the delustering agent, those already known can optionally be adopted. However, since in the present invention, not only the glossiness is provided to the surface but also the low glossiness to the metallic luster feeling below the low glossiness-resin layer, it is preferable to ensure the transparency so as not to cloud the metallic luster feeling of the metallic luster layer on the lower side as much as possible. In this regard, as a delustering agent, those having the transparency are preferable. As such delustering agents, for example, inorganic delustering agents of particles of silica, spherical silica, alumina, kaolinite, calcium carbonate, barium sulfide, or a glass, or organic delustering agents such as polycarbonate resins, acrylic resins, polyamide (nylon) resins, urea resins and silicon based resins can be used. The particle shapes of the delustering agents include spherical, polyhedron, scale-like, or the like. Moreover, the particle size of the delustering agent is about 1 to 10 μm. The addition amount of the delustering agent may be an addition amount according to the required low glossiness level. Moreover, as the delustering agent, since the low glossiness-resin layer provides the uppermost surface layer, it is preferable to select one having the excellent wear resistance. Examples thereof include the delustering agents of the spherical silica, or the alumina. The average particle size of the delustering agent is in general 1 to 10 μm.

Moreover, as the resin for the resin binder, one can be adopted optionally according to the application. For example, thermoplastic resins such as acrylic resins, vinyl-chloride-vinyl acetate copolymes, polyester resins, cellulose based resins, or urethane resins are used. Moreover, as the resin, in terms of the drawability in the molding application, thermoplastic resins are more preferable than curing resins such as thermosetting resins and ionizing radiation curing resins. However, if such a performance is not required, in consideration to the other required physical properties such as the adhesion properties and the heat resistance, curing resins such as urethane resins, acrylic resins and alkyd resins may be used.

The low glossiness-resin layer may be colored and transparent by further containing a coloring agent. As the coloring agent, known coloring agents can be used.

In the low glossiness-resin layer in the present invention having a large number of the minute opening parts, the above-mentioned minute opening parts may be provided not completely through the low glossiness-resin layer, or they may be provided with the thickness of the low glossiness-resin layer provided partially to the degree that the metallic luster of the metallic luster layer can be visually recognized.

The minute opening parts of a form, with the thickness of the low glossiness-resin layer provided partially to the degree that the metallic luster of the metallic luster layer can be visually recognized, can be formed mainly by covering the openings with spread of the low glossiness resin ink after printing the low glossiness-resin layer. However, since the thickness of the low glossiness-resin layer becomes thinner in a spreading portion so that the effect of the delustering agent is not sufficient compared with the other portions, and thus the metallic luster layer can be visually recognized through the portion to allow the opening parts to function as a substantial minute opening part.

In the case the minute opening parts are provided with the thickness of the low glossiness-resin layer provided partially as a thickness to the degree that the metallic luster of the metallic luster layer can be visually recognized, the thickness of the low glossiness-resin layer in the minute opening parts is not particularly limited as long as the metallic luster of the metallic luster layer can be visually recognized to a desired degree from the minute opening parts in accordance with, such as the kind of the above-mentioned metallic luster layer, or the kind of the above-mentioned binder resin and delustering agent.

As to the size of the minute opening parts 4, a size to the extent not apparent by the visual observation of the low glossiness-metallic luster decorative sheet from an ordinary distance when applied for its application is preferable, in terms of not deteriorating the design of the entire decorative sheet. The opening parts are provided minutely to satisfy the above-mentioned condition. The specific size of the minute opening parts (that is, the size in the decorative sheet surface direction) is about 1 mm or less in the application to be observed by a long distance of 1 m or more; it is 500 μm or less in the case of the application to be observed by a distance of about 30 cm; and it is preferably 200 μm or less so as not to be seen substantially. With a smaller size, the minute opening parts can certainly be made unapparent, however, in contrast, the size cannot be stable due to flow-in of the ink at the time of printing formation, or the like so that it can be determined in consideration to such as the reproductivity. On the other hand, with a smaller size of the minute opening parts, the portion of the metallic luster layer to be observed from the oblique direction is reduced by the inner side wall of the minute opening parts, however, since the portion with only the low glossiness-resin layer viewed is increased, the change in the metallic luster light feeling and the low glossiness feeling caused by the angle can be provided. Therefore, in general, the size of the minute opening parts is about 10 to 500 μm, and it is preferably about 50 to 200 μm.

The (opening) shape of the minute opening parts 4 is not particularly limited, and thus it can be selected optionally as round, elliptical, or polygonal such as triangular, quadrilateral (square, rectangle). It may be one shape alone or a mixture of a plurality of shapes. However, since a round shape has a good shape stability, it is commonly preferable.

Moreover, the dispersion state in which a large number of the minute opening parts are scattered may be, in addition to a regular arrangement such as various kinds of lattices, a random irregular arrangement.

Then, the ratio of the metallic luster feeling to be observed through the minute opening parts is adjusted by adjusting the area ratio (opening ratio) of the minute opening parts in the entire surface by the size of the minute opening parts and the area density of scattering the same. The opening ratio may be adjusted optionally for example in the range of 5 to 40%. If an opening ratio is of more than 40%, opening portion in the entirety becomes too wide, and a portion with a high glossiness becomes so much when observed from the front surface that the entire glossiness becomes too high. On the other hand, if the opening ratio is of less than 5%, opening portion becomes too narrow in the entirety, and the glossiness difference by the angle cannot be felt.

As to the formation of the low glossiness-resin layer having the minute opening parts mentioned above, it can be formed by such as gravure direct printing, offset gravure printing, or screen printing using a low glossiness resin ink. In the gravure direct printing, desired minute opening parts can be formed by providing the minute opening parts on the gravure plate surface so as not to have a mere solid printing with no minute opening parts formed. Such a gravure plate can be produced by electronic mechanical engraving (HelioKlischograph) (Helio gravure plate), or it can be produced by laser engraving (laser gravure plate).

At the time of forming the low glossiness-resin layer, if the low glossiness-resin layer is spread in the non printing portion to the extent that the low glossiness feeling and the metal feeling remain in the low glossiness-resin layer in the printing portion, a minute opening part of a form with the low glossiness-resin layer thickness provided partially thinly can be formed. Here, the phenomenon of spreading the low glossiness resin ink in the non printing portion to the extent that the low glossiness feeling and the metal feeling remain in the low glossiness-resin layer in the printing portion derives largely from the ink transfer amount to the printing portion (the height and the area ratio of the printing portion) and the ink flowability (the viscosity and the thixotropic properties). With a larger ink transfer amount to the printing portion, the non printing portion can easily be covered with the ink from the printing portion. The ink transfer amount is adjusted by the plate depth in the case of the gravure printing. With the ink transfer amount of 4 $g/m^2$ or more based on the dry coating amount equivalent, although it depends also on the conditions, the spreading phenomenon can easily be generated. On the other hand, if the ink from the printing portion was a large viscosity, the ink barely spreads to the non printing portion, however, if it is too small in viscosity, the metal feeling in the printing portion cannot be remarkable. Moreover, with large thixotropic properties, the ink flow from the printing portion to the non printing portion is not generated at all or generated merely slightly. On the other hand, with an extremely small ink thixotropic property, spread of the ink from the printing portion to the non printing portion is so large that a state with the leveled flat surface or a state close to that is provided. Therefore, in this case, it is same as a coating film with the even entire surface thickness so that the delustering feeling is strengthened, but the metal feeling cannot be remarkable. The thixotropic properties of the ink is adjusted to an adequate amount not so large and not so small such that the metal feeling by the metallic luster layer can be observed visually through the spread portion even in the case of spreading. However, the degree of the preferable thixotropic properties also depends on the pattern shape of the printing portion (the film thickness or the ink transfer amount, the width, or the like), or the pattern of the non printing portion.

<Adhesive Layer>

The adhesive layer 5 is a layer provided on the rearmost surface of the low glossiness-metallic luster decorative sheet for strengthening the adhesion force at the time of bonding and laminating the low glossiness-metallic luster decorative sheet to an adherend such as a substrate, and it is provided optionally as needed. As the adhesive layer 5, known resins may be used optionally. As the resin, for example, acrylic resins, vinyl chloride-vinyl acetate copolymers, chlorinated polyolefin resins, urethane resins, or rubber based resins are used. As to the formation of the adhesive layer, it may be formed by a known coating method or printing method.

<Other Layers>

The low glossiness-metallic luster decorative sheet according to the present invention may be optionally provided with, in addition to the above-mentioned adhesive layer 5, an additional layer known in the conventional decorative sheets, such as a decorative layer, a backer layer, or a primer layer as needed. The decorative layer is a printing pattern layer representatively, provided on an optional surface of the low glossiness-metallic luster decorative sheet or between the layers. The same is applied to the formation surface of the primer layer. The backer layer is a reinforcing layer on the rear surface side, and it is representatively a thermoplastic resin sheet. Moreover, the backer layer may be colored, opaque, or the like by addition of a coloring agent. The thickness of the backer layer depends on such as the application, and it is in general about 50 to 500 μm. Moreover, by providing the backer layer, the mechanical strength of the low glossiness-metallic luster decorative sheet as a whole is supported not by the substrate sheet but mainly by the backer layer so that the substrate sheet may be provided as a thin sheet while considering the operation suitability at the time of forming the metallic luster layer or the low glossiness-resin layer. Moreover, the molding properties at the time of use for the molding application can also be adjusted.

Here, the low glossiness-metallic luster decorative sheet 10 shown in FIG. 3B is a configuration example with the backer layer 6 laminated via the adhesive layer 7. The backer layer 6 may be laminated by a known lamination method, and typically, it is laminated via the adhesive layer 7 by the dry lamination method. As the adhesive layer 7, a known resin may be used optionally. As the resin, the resins mentioned for the above-mentioned adhesive layer 5, or the like can be presented.

<Application of the Low Glossiness-Metallic Luster Decorative Sheet>

The application of the low glossiness-metallic luster decorative sheet of the present invention is not particularly limited. However, since the low glossiness of the present invention is realized by the low glossiness-resin layer containing a delustering agent without relying on the surface ruggedness formed by the emboss process, the surface glossiness degree can hardly be changed even in the case of being used for the molding application with heat, or heat and stress (stretch, compression in the thickness direction, or the like) applied at the time of molding, and in this regard, the molding application is a preferable application.

As the molding method in the molding application, the so-called injection molding simultaneous lamination method (see for example Japanese Patent Publication (JP-B) Nos. 50-19132 and 43-27488) can be presented representatively. As the injection molding simultaneous lamination method, a method of drawing (molding) the low glossiness-metallic luster decorative sheet for laminating onto the surface of a shaped product as the adherend is typical in the forms thereof. It also includes the insert molding method, and a form thereof in which the low glossiness-metallic luster decorative sheet is loaded in an injection molding mold and the sheet is laminated onto the surface of the shaped product simultaneously with the molding of a resin shaped product, the adherent, without drawing the low glossiness-metallic luster decorative sheet.

Alternatively, it may be an application of the vacuum molding lamination method, or the vacuum molding method (including the vacuum compressed air molding), or the like in which the shaped low glossiness-metallic luster decorative sheet itself is the final purpose and it is molded without lamination onto the adherend. As it is disclosed in JP-B Nos. 56-45768 (overlay method), 60-58014 (vacuum press method) and others, the vacuum molding lamination method is a method of facing or placing the low glossiness-metallic luster decorative sheet on the surface of a three-dimensional substrate such as a shaped product for laminating the low glossiness-metallic luster decorative sheet on the surface of the substrate through the pressure difference by at least the vacuum suction from the substrate side, and optionally in combination with the compressed air forcing from the low glossiness-metallic luster decorative sheet side.

Moreover, the vacuum molding method, the compressed air molding method, the vacuum compressed air molding method, the wrapping process method, the V cut method, the U cut process method, or the like can also be presented.

In the injection molding simultaneous lamination method, there are various kinds of forms of sheet molding for the molding sheet to be used (it is the low glossiness-metallic luster decorative sheet). The low glossiness-metallic luster decorative sheet of the present invention can be used for all of them. That is, they are (A) a form with sheet molding, and (B) a form without sheet molding. The former (A) form with sheet molding further includes such as: (A1) a form of offline preliminary molding of preliminary molding a sheet outside the injection molding mold; (A2) a form of inline preliminary molding of preliminary molding a sheet in the mold, before resin injection, using an injection molding mold in combination with a vacuum molding mold (including a vacuum compressed air molding); and (A3) a form of sheet molding, without preliminary molding, of molding a sheet with the heat and pressure of the injection resin at the time of the injection by using the injection molding mold. The incomplete molding shape in details in the forms (A1), (A2) may be finally shaped by (A3). Moreover, the so-called insert molding corresponds to (A3) and (B).

Here, with reference to the conceptual diagram of FIGS. 5A to 5C, the so-called injection molding simultaneous lamination method will be explained schematically. The form to be explained here is the case of using the low glossiness-metallic luster decorative sheet for the form of the inline preliminary molding, in which the sheet molding of (A2) is carried out with the injection molding mold in the vacuum molding process.

First, as shown in FIG. 5A, as the injection molding mold, a pair of molding molds of a mold Ma having a sprue (runner) and a gate (gate) communicating with the injection nozzle, and a mold Mb having a suction hole 41 on the cavity surface to serve also as the preliminary molding mold for the vacuum molding process of the low glossiness-metallic luster decorative sheet is used. These molds are made of a metal such as iron or ceramic. In the mold open state, with the low glossiness-metallic luster decorative sheet 10 supplied between the molds Ma and Mb, the low glossiness-metallic luster decorative sheet 10 is fixed onto the mold Mb by such as pressing with a sheet clamp 42 of a frame with a shape in the plan view. At the time, the rear surface side of the low glossiness-metallic luster decorative sheet is disposed on the injection resin side on the right side of the figure. Then, as shown in FIG. 5B, a heater 43 withdrawn at a withdrawal position outside the mold (above the mold in the figure) is moved optionally so as to be inserted between the molds for heating and softening the low glossiness-metallic luster decorative sheet by the heater 43. The heating operation may be carried out by for example radiation heating without contact, but it may be conduction heating by contact. Then, by vacuuming from the suction hole for vacuum molding, the low glossiness-metallic luster decorative sheet is preliminarily shaped along the cavity surface of the mold Mb. With the heater withdrawn from between the molds, the molds are clamped as shown in FIG. 5C for filling the cavity formed by the molds with a resin in a fluid state of such as a heated molten state. After solidifying the resin by such as cooling, the molds are opened for taking out the shaped product. By optionally trimming the unnecessary portion of the low glossiness-metallic luster decorative sheet, a laminated body can be obtained as the shaped product with the low glossiness-metallic luster decorative sheet laminated on the surface of the resin shaped product.

<Laminated Body>

The laminated body of the present invention has a configuration with the above-mentioned low glossiness-metallic luster decorative sheet 10 laminated on the substrate surface with its rear surface side facing the substrate side. The cross-sectional view of FIG. 4 shows a form thereof. The laminated body 20 of FIG. 4 has a configuration with the low glossiness-metallic luster decorative sheet 10 shown in FIG. 1A laminated on the surface of the substrate 8 by the adhesive layer 5. Although the adhesive layer 5 is provided here as a constituent element of the low glossiness-metallic luster decorative sheet 10, after providing the same on the surface of the substrate 8, the low glossiness-metallic luster decorative sheet of a configuration without the adhesive layer 5 may be used and laminated.

As the substrate 8, those of optional materials and shapes may be adopted according to the application. For example, as to the shape, a plate material such as a flat plate and a curved plate, a three-dimensionally shaped product, or a film (or a sheet) can be presented. Moreover, as the material, for example, resin materials used as a plate material, a three-dimensionally shaped product, or a sheet, such as polyolefin based resins, acrylic resins, polyester based resins, polystyrene resins, ABS resins, phenol resins, vinyl chloride resins, cellulose based resins and rubber; wood materials used as a plate material, or a three-dimensionally shaped product, such as a wood single plate, a wood plywood, a particle board and a MDF (medium fiber board); metal materials used as a plate material, a three-dimensionally shaped product or a sheet, such as iron and aluminum; non cement ceramic based materials such as glass, ceramics including a chinaware, and a gypsum; ceramic based materials to be used as a plate material, a three-dimensionally shaped product, or the like of non chinaware ceramic based materials such as an ALC (lightweight foamed concrete) plate; or papers to be used as a sheet such as a plain paper and a Japanese paper, non woven fabrics and woven fabrics of fibers of carbon, asbestos, glass, or synthetic resin can be presented.

Among these examples, the characteristics of the present invention that the little glossiness change occurs before and after the molding operation can be utilized in a shaped product of a resin or a three-dimensionally shaped product of a wood material, or the like with the low glossiness-metallic luster decorative sheet laminated by the molding method.

EXAMPLES

Hereinafter, the present invention will be explained further specifically with reference to the examples and the comparative examples.

Example 1

A bright resin layer was formed by gravure printing a bright ink, containing scale-like aluminum powders in a resin binder of a thermoplastic acrylic resin, on the entirety of the rear side surface of a substrate sheet 1 of a 125 μm thickness transparent acrylic resin film. Subsequently, a printed sheet with a heat sensitive adhesion type adhesive layer 5 formed was produced by gravure printing a mixture resin ink of a thermoplastic acrylic resin and a vinyl chloride-vinyl acetate copolymer on the entire surface.

A low glossiness-metallic luster decorative sheet 10 as in the cross-sectional view of FIG. 1A was produced as follows: printing a delustering ink, with a silica added in an acrylic resin binder as the delustering agent, on the front side surface of the substrate sheet of the printed sheet by the direct gravure printing using a Helio gravure plate having a portion corresponding to the minute opening parts by a 2 $g/m^2$ coating amount (solid component, the same is also applied hereafter); and forming a low glossiness-resin layer 3 having the minute opening parts 4. The minute opening parts having a 200 μm diameter round shape were scattered evenly like a lattice, with a 20% area ratio. Moreover, the low glossiness degree by the specular gloss Gs (60°) based on the JIS Z 8741 was 15. Then, a metallic luster feeling with low glossiness and high brilliance was obtained.

Furthermore, a laminated body 20 as shown in FIG. 4 was obtained by using the above-mentioned low glossiness-metallic luster decorative sheet 10 in the injection molding simultaneous lamination method of a form of inline preliminary molding in which the sheet is preliminarily molded in an injection molding mold. Without the glossiness change at the time of molding, the laminated body was provided as a molded product having a metallic luster feeling with high brilliance and low glossiness.

Example 2

A low glossiness-metallic luster decorative sheet was produced in the same manner as in the example 1 except that the low glossiness-resin layer was printed and formed with the gravure plate changed to a laser gravure plate and with a 3 $g/m^2$ coating amount in the example 1. The minute opening parts having a 200 μm diameter round shape were scattered evenly like a lattice, with a 10% area ratio. Moreover, the specular gloss Gs (60°) was 9 so as to obtain a metallic luster feeling with low glossiness and high brilliance.

Then, a laminated body was shaped in the same manner as in the example 1. Without the glossiness change at the time of molding, the laminated body was provided as a molded product having a metallic luster feeling with high brilliance and low glossiness.

Example 3

A printed sheet was formed by gravure printing two colors of bright inks, containing scale-like aluminum powders in a resin binder of a thermoplastic acrylic resin, on the rear side surface of a substrate sheet 1 of a 75 μm thickness transparent acrylic resin film so as to form a bright resin layer 2 of a hairline like pattern. In the two color printing, a first color bright ink of a slightly dark color, with a carbon black added was used for printing a hairline like pattern, and the ink as it is was used as a second color for printing the entire surface solidly.

A low glossiness-resin layer 3 having minute opening parts was formed in the same manner as in the example 2 using a laser gravure plate on the front side surface of the substrate sheet in the printed sheet. Next, a low glossiness-metallic luster decorative sheet with a backer layer was obtained by dry lamination of a backer sheet, as a backer layer, of a 420 μm thickness ABS (acrylonitrile-butadiene-styrene copolymer) resin backer sheet on the rear side surface of the obtained sheet via a urethane based adhesive. The specular gloss Gs (60°) was 9 and a metallic luster feeling with low glossiness and high brilliance was obtained.

Then, a laminated body was shaped in the same manner as in the example 1. Without the glossiness change at the time of molding, the laminated body was provided as a molded product having a metallic luster feeling with high brilliance and low glossiness.

Comparative Example 1

A low glossiness-metallic luster decorative sheet was produced in the same manner as in the example 1 except that the substrate sheet 1 was changed to a 125 μm thickness transparent acrylic resin film containing a delustering agent in the resin and formation of the low glossiness-resin layer was omitted in the example 1, and by successively forming the bright resin layer, and the adhesive layer on the rear surface side of the substrate sheet. The specular gloss Gs (60°) was 36 so as to provide low glossiness, however, the delustering degree was not as much as in the example 1.

Then, a laminated body was shaped in the same manner as in the example 1. The glossiness change at the time of molding was large such that the specular gloss Gs (60°) in the laminated body was raised to 54 so as to lower the delustering degree.

Comparative Example 2

A low glossiness-metallic luster decorative sheet was produced in the same manner as in the example 1 except that a low glossiness-resin layer without minute opening parts was formed using an ordinary laser gravure plate without a portion corresponding to the minute opening parts at the time of forming the low glossiness-resin layer in the example 1. The specular gloss Gs (60°) was 9 so as to provide low glossiness, however, the metallic luster feeling was without high brilliance as in the example 1 compare to that the example 1 provides a feeling close to the real metal.

Then, a laminated body was shaped in the same manner as in the example 1. Although there was no glossiness change at the time of molding so as to have low glossiness, the metallic luster feeling was not of high brilliance.

INDUSTRIAL APPLICABILITY

Since a low glossiness-metallic luster decorative sheet of the present invention realizes the low glossiness by a low glossiness-resin layer, containing a delustering agent, without relying on the surface ruggedness formed by the emboss process, the surface glossiness degree has little change even in the case of using the sheet for the molding application with heat, or heat and stress (stretch or compression in the thickness direction, or the like) applied at the time of molding. In this regard, it can be preferably utilized for the molding application.

The invention claimed is:

1. A low glossiness-metallic luster decorative sheet comprising: a substrate sheet, a metallic luster layer provided on a front side surface of the substrate sheet, and a low glossiness-resin layer containing a delustering agent provided on a front side surface of the metallic luster layer,
    wherein an adhesive layer is formed on a surface which is an opposite side of the substrate sheet where the glossiness-resin layer is formed,
    the metallic luster layer is a bright resin layer containing a bright pigment in a resin, a metal thin film layer, or a metal foil, and the bright pigment is a metal powder, a metal foil, titanium dioxide covered mica, or acid bismuth chloride,
    wherein the low glossiness-resin layer has plural minute depressions formed and scattered in the surface of the low glossiness-resin layer so that a part of the metallic luster layer can be observed when the low glossiness-metallic luster decorative sheet is observed from the low glossiness-resin layer side;
    the minute depressions do not pass through the low glossiness-resin layer from a front side surface of the low glossiness-resin layer to the front side surface of the metallic luster layer, but are formed so as a thickness of the low glossiness-resin layer in the minute depressions becomes thinner than a thickness of the low glossiness-resin layer in portions other than the minute depressions to allow a visual observation of metallic luster of the metallic luster layer;
    a shape of the minute depressions is round, elliptical, or polygonal;
    a size of the minute depressions is 10 μm to 500 μm; and
        the area ratio of the minute depressions of the low glossiness-resin layer to the entire surface of the metallic luster layer is in the range of 5% to 40% in planar view.

2. A laminated body comprising a substrate and the low glossiness-metallic luster decorative sheet according to claim 1, wherein the substrate and the low glossiness-metallic luster decorative sheet are laminated, and the low glossiness-metallic luster decorative sheet is adhered to a surface side of the substrate by the adhesive layer.

3. The low glossiness-metallic luster decorative sheet according to claim 1, wherein a backer layer is formed on the adhesive layer on a surface which is opposite to the substrate sheet.

* * * * *